United States Patent
Hummen et al.

(10) Patent No.: US 11,133,884 B2
(45) Date of Patent: Sep. 28, 2021

(54) DETERMINING REQUIRED PROCESSING TIME OF A DATA NETWORK

(71) Applicant: Hirschmann Automation and Control GmbH, Neckartenzlingen (DE)

(72) Inventors: Rene Hummen, Nuertingen (DE); Florian Mueck, Filderstadt (DE); Stephan Kehrer, Dusslingen (DE)

(73) Assignee: HIRSCHMANN AUTOMATION AND CONTROL GMBH, Neckartenzlingen (DE)

( * ) Notice: Subject to any disclaimer, the term of this patent is extended or adjusted under 35 U.S.C. 154(b) by 0 days.

(21) Appl. No.: 16/341,891

(22) PCT Filed: Nov. 21, 2017

(86) PCT No.: PCT/EP2017/079913
§ 371 (c)(1),
(2) Date: Apr. 13, 2019

(87) PCT Pub. No.: WO2018/091736
PCT Pub. Date: May 24, 2018

(65) Prior Publication Data
US 2019/0356402 A1     Nov. 21, 2019

(30) Foreign Application Priority Data
Nov. 21, 2016 (DE) .......................... 102016122292.5

(51) Int. Cl.
*H04L 12/26*     (2006.01)
*H04J 3/06*     (2006.01)

(52) U.S. Cl.
CPC ........ *H04J 3/0655* (2013.01); *H04L 43/0858* (2013.01); *H04L 43/10* (2013.01)

(58) Field of Classification Search
CPC ..... H04L 43/10; H04L 43/0858; H04J 3/0655
USPC ......................................................... 370/347
See application file for complete search history.

(56) References Cited

U.S. PATENT DOCUMENTS

| | | | |
|---|---|---|---|
| 6,097,699 A | 8/2000 | Chen | |
| 6,661,810 B1 | 12/2003 | Skelly | |
| 10,394,734 B1 * | 8/2019 | Mallela | ................. G06F 13/32 |
| 2007/0195797 A1 * | 8/2007 | Patel | .................... H04J 3/0685 370/400 |
| 2010/0125661 A1 * | 5/2010 | Perala | ................. H04L 43/0852 709/224 |

(Continued)

*Primary Examiner* — Gbemileke J Onamuti
(74) *Attorney, Agent, or Firm* — Andrew Wilford

(57) ABSTRACT

End-to-end latency in a data network containing a succession of network devices through which a data packet passes via data connections is determined by first providing the data packet with a trigger packet. Then each device generates and adds to the trigger packet a respective reception timestamp indicating when the packet is received by the respective device. This added data indicates time needed for travel from the immediately upstream network device such that, when reaching the furthest downstream device of the succession of network devices, the trigger packet holds a plurality of timestamp representing when the trigger packet was received by the network devices. Finally the end-to-end latency is calculated at the furthest downstream network device from all of the time stamps in the trigger packet.

9 Claims, 2 Drawing Sheets

Trigger frame in the event of an error

| Header | Data ED1 | | Data SW1 | | | Data SW2 | | | Data SWx | | | Data ED2 | |
|---|---|---|---|---|---|---|---|---|---|---|---|---|---|
| | Meta-data | 0ns | Meta-data | 10ns | 110ns | Meta-data | 120ns | 550ns | Meta-data | 560ns | 660ns | Meta-data | 670ns |

ED: End Device
SW: Switch
TS: Time Stamp
$Ts_{in}$: ingress Time Stamp (Rx)
$Ts_{out}$: engress Time Stamp (Tx)

(56) References Cited

U.S. PATENT DOCUMENTS

| | | | |
|---|---|---|---|
| 2011/0064091 A1* | 3/2011 | Darras | H04J 3/0673 |
| | | | 370/458 |
| 2011/0164518 A1* | 7/2011 | Daraiseh | H04L 45/125 |
| | | | 370/252 |
| 2014/0010094 A1* | 1/2014 | Robitaille | H04L 43/0858 |
| | | | 370/252 |
| 2015/0312130 A1 | 10/2015 | Klanner | |
| 2016/0308791 A1* | 10/2016 | Subasingha | H04L 12/56 |

* cited by examiner

Trigger frame structure

| Header | Data ED1 | | Data SW1 | | | Data SW2 | | | Data SWx | | | Data ED2 | |
|---|---|---|---|---|---|---|---|---|---|---|---|---|---|
| | Meta-data | $TS_{out}$ | Meta-data | $TS_{in}$ | $TS_{out}$ | Meta-data | $TS_{in}$ | $TS_{out}$ | Meta-data | $TS_{in}$ | $TS_{out}$ | Meta-data | $TS_{in}$ |

ED: End Device
SW: Switch
TS: Time Stamp
$Ts_{in}$ : ingress Time Stamp (Rx)
$Ts_{out}$: engress Time Stamp (Tx)

Fig. 4

Trigger frame in the event of an error

| Header | Data ED1 | | Data SW1 | | | Data SW2 | | | Data SWx | | | Data ED2 | |
|---|---|---|---|---|---|---|---|---|---|---|---|---|---|
| | Meta-data | 0ns | Meta-data | 10ns | 110ns | Meta-data | 120ns | 550ns | Meta-data | 560ns | 660ns | Meta-data | 670ns |

ED: End Device
SW: Switch
TS: Time Stamp
$Ts_{in}$ : ingress Time Stamp (Rx)
$Ts_{out}$: engress Time Stamp (Tx)

Fig. 5

DETERMINING REQUIRED PROCESSING TIME OF A DATA NETWORK

CROSS REFERENCE TO RELATED APPLICATIONS

This application is the US-national stage of PCT application PCT/EP2017/079913 filed 21 Nov. 2017 and claiming the priority of German patent application 102016122292.5 itself filed 21 Nov. 2016.

FIELD OF THE INVENTION

The invention relates to a method of operating a data network containing network devices that exchange data packets over data connections, wherein a mechanism is operated in order to determine at least one end-to-end latency between network devices.

BACKGROUND OF THE INVENTION

In many networks, in particular data networks, there are mechanisms (for example ping or traceroute) for being able to determine the end-to-end latency between devices (also referred to as network devices) and/or the reachability of devices in the network on a random basis.

For networks with real-time capabilities, in which there are high requirements in terms of latency and determinism (in particular those that operate in accordance with the "TDMA" time-slot method), further mechanisms and methods are additionally required in order to be able to perform more accurate latency measurements and in order to be able to determine when a data packet is received, transmitted or relayed. This allows reliable debugging and monitoring, for example checking as to whether a data packet "meets" the time-slot assigned thereto in the context of the time-slot method.

OBJECT OF THE INVENTION

The invention is based on the object of improving a method of operating a data network in terms of determining the latency times and of avoiding the disadvantages outlined at the outset.

SUMMARY OF THE INVENTION

According to the invention, it is provided that, as a mechanism, a trigger packet is transmitted from a network device to at least one further network device, and a timestamp is used to establish when the trigger packet has reached this at least one further network device. In a first refinement, the trigger packet is transmitted by a network device in addition to the data packets that are exchanged over the wired and/or wireless data connections in the data network and received by at least one further, for example a plurality, preferably all network devices. If the trigger packet is received by at least one network device, a timestamp is recorded that is used to establish when the trigger packet reached the respective network device. It is possible to establish the temporal profile that the trigger packet required from network device to network device from the time stamps. It is possible to determine the end-to-end latency between network devices from this temporal profile. In another refinement, no additional trigger packet is sent, but rather a data packet itself is used as trigger packet. If such a data packet is received by at least one network device, a timestamp is recorded that is used to establish when the data packet reached the respective network device. It is possible to establish the temporal profile that the data packet required from network device to network device from the time stamps. Using the data packets, which requires no additional trigger packets in comparison with the first refinement since the data packets themselves are used as trigger packets, it is possible to determine the end-to-end latency between network devices from this temporal profile.

In one development of the invention, it is provided that, in addition to the timestamp that is established (generated) upon reception of a packet, a timestamp is likewise established (determined) at the time of transmission of a packet. This timestamp, together with the timestamp that was determined at the reception time of the packet in the same network device, may then be used to determine the residence time of the packet in this network device. Since both time stamps in a network device are based on the local clock of the same network device, the residence time is able to be determined precisely. This information may be highly valuable when determining the causes in the event of delayed delivery of a packet.

In one development of the invention, it is provided that the timestamp established in the at least one further device is inserted into the trigger packet as a partial data packet and forwarded. Each network device that receives the trigger packet thus has available to it the timestamp or time stamps that in the at least one network device from which it was transmitted. If the network device that receives this trigger packet establishes the reception, this network device determines this time and establishes a timestamp that it in turn inserts into the received trigger packet as a partial data packet and forwards the trigger packet supplemented by its own timestamp. A timestamp may likewise be determined and inserted into the trigger packet situated in the transmission at the time of forwarding. This forwarding may be performed to a single network device, to a group of network devices or to all network devices of the respective data network.

As an alternative or in addition to inserting time stamps into the trigger packet as partial data packets, in one development of the invention, it is provided that the timestamp established in the at least one further device is stored on this network device and provided for further network devices and/or a network management station (network management system). In addition to the insertion of time stamps of the respective network device into the trigger packet, the timestamp established in the respective network device is also or only stored on the network device, such that it is locally available and is able to be queried. This querying may be performed by way of a corresponding request to a further network device and/or a network management station in the network device on which the established timestamp has been generated and stored. When inserting time stamps, it is conceivable for the trigger packet to have a particular length and for this length to be enlarged through the insertion of time stamps. As an alternative thereto, it is conceivable for space to be kept aside in the trigger packet for the insertion of time stamps, such that the insertion of time stamps does not change the length of the trigger packet.

In one development of the invention, the timestamp that has been established on the respective network device is assigned further data of that network device that establishes the timestamp. These may be metainformation, such as for example a device identifier, a MAC address, the type of the network device and the like.

In one development of the invention, the temporal profile of the data relaying of the trigger packet over the data connections that are involved is determined from the timestamp of a respective network device. Using the trigger packet independently of the rest of the data exchange between the network devices over the data connections in the data network has the advantage that the data exchange is not delayed by determining and forwarding time stamps. The trigger packets are transmitted, received and forwarded independently of the rest of the data packets that are exchanged between the network devices. To be able to determine the end-to-end latency, the time stamps established in the network devices that are involved are taken into consideration, such that the duration for the transmission of the trigger packet from the transmitting network device as far as the last network device that receives the trigger packet is able to be established therefrom. No further network device or else at least one further network device (in practice a multiplicity of network devices) may be arranged between the network device that transmits the trigger packet and the network device that is the last one to receive the network device (the end-to-end latency being intended to be determined between these two network devices).

The method according to the invention thus achieves an end-to-end latency determination. As an alternative or in addition thereto, it also provides a considerably higher granularity or temporal resolution. This is because, by virtue of the method according to the invention, the latencies of any desired partial paths as far down as individual path segments of the transmission media of the network are also able to be determined. This is possible because the reception and transmission time stamps of the individual network devices are gathered and not added into one value. The term "granularity" is understood to mean a precise determination of the transmission time of the trigger packets that is required for the transmission of the trigger packets from a starting point, which may be selected as desired, to an end point, which may likewise be selected as desired. This transmission time depends in particular on when a trigger packets arrives in a network device (that is recorded by way of a timestamp) and when it has been transmitted again by this network device (that is likewise recorded by way of a timestamp). The time interval between the arrival of the trigger packet on the network device and the transmission of this trigger packet indicates the processing time of at least one data packet that was likewise received, processed (or only forwarded) and transmitted by this network device. For determination of the transmission time (latency time) that is as precise as possible, the times of arrival of both the trigger packet and the data packet and, independently thereof, the times of transmission of both the trigger packet and the data packet advantageously coincide. This means that the timestamp for the arrival of the trigger packet and the timestamp for the transmission of the trigger packet is a measure of how long the processing (or only the forwarding) of at least one data packet required in the network device. The transmission times of a respective trigger packet between the transmission from a network device until the arrival on a further network device that receives the trigger packet may furthermore be determined. As a result, the transmission times of the trigger packets between the network devices that are for example dependent on the type and the length of a cable or are dependent on a wireless transmission, are able to be determined precisely by acquiring the times of the trigger packets between the transmission from a network device until the reception on a subsequent network device. This procedure may be repeated as often as desired on the entire transmission path or on segments thereof, such that it is possible to determine an end-to-end latency on a predefined partial path or the entire network path at any time.

The method according to the invention may thus, as an alternative or in addition, be executed in four different ways.

1. In addition and independently of the data packets containing payload content, trigger packets are transmitted on the network and received by network devices. Upon reception and preferably also upon transmission of a received trigger packet, a timestamp is recorded that is inserted into the trigger packet on the network device on which the trigger packet is currently situated and is forwarded. When the trigger packet reaches a further network device, exactly the same procedure is applied there, such that further time stamps are inserted into the trigger packet as the method progresses. In this case, the trigger packets exist in addition to the data packets.

2. In addition and independently of the data packets containing payload content, trigger packets are transmitted on the network and received by network devices. Upon reception and preferably also upon transmission of a received trigger packet, a timestamp is recorded that is stored on the network device on which the trigger packet is currently situated. Exactly the same method is applied when the trigger packet is forwarded and received by a further network device. In this case, the time stamps are thus not contained in the trigger packets, but rather they are stored on the respective network device and are able to be retrieved therefrom. This is performed for example by way of a network management system. In this case as well, the trigger packets exist in addition to the data packets.

3. Instead of additional trigger packets, the data packets are used for the transmission of the recorded time stamps. This means that the data packets in this case carry payload content and also information about their reception and/or their transmission to a network device. Upon reception and preferably also upon transmission of a received data packet, a timestamp is recorded that is inserted into the data packet on the network device on which the data packet is currently situated and is forwarded. When the data packet reaches a further network device, exactly the same procedure is applied there, such that further time stamps are inserted into the data packet as the method progresses. In this case, no trigger packets exist. In other words, this means that, upon arrival of a data packet that functions as a trigger packet on a network device, a timestamp and/or upon transmission of a data packet that functions as a trigger packet, a timestamp is recorded and inserted into the data packet.

4. Likewise instead of additional trigger packets, the data packets are used for the determination of the transmission time. However, the time stamps recorded on the respective network devices are not inserted into the data packet, but rather stored in the network device on which they were just recorded. This has the advantage that the data packets are able to be used to determine the arrival and/or the departure time on the respective network device, without this information having to be inserted into the data packet. This means that the timestamp is available, but the data packet, more precisely its payload, remains unchanged and the data packet is thus able to be forwarded in unchanged form. At the same time, however, the at least one recorded timestamp is available in the network device and is in turn able to be read by a network management system. In other words, this means that, upon arrival of a data packet that functions as a trigger packet on a network device, a timestamp and/or upon transmission of a data packet that functions as a trigger packet, a timestamp is recorded and stored on the network device on which the timestamp was recorded.

The invention thus relates at least to the aspect of end-to-end measurements. In general, however, the measurement does not need to be performed from the actual end (or start) to the actual end, but rather it may also be performed as a path segment latency determination method, using which any desired partial path latencies and, ultimately, the end-to-end latency is able to be derived. This means that the term "end-to-end" should not be understood to mean the actual first network device and the last network device, for example in a line topology, but rather that any desired path segments may be defined that are then determined by a first network device and a last network device, between which no, at least one or preferably a plurality of network devices are situated, such that the latency for the transmission of the trigger packets between this one and this further network device is able to be determined. This one and this further network device may be the actual first and last network device in the network, but do not have to be so. Ideally and preferably, a timestamp is thus recorded in the network devices when a trigger packet arrives, and a further timestamp is recorded when this trigger packet leaves the network device again after processing thereof (for example storage) and/or processing (or forwarding) of the received data packets. From these recorded time stamps, it is possible to determine the transmission times (latencies) on any desired sections of the network or the entire network, taking into account the processing or forwarding times of data packets in the respective network device, including the transmission times on the transmission medium between the individual network devices (wired or wireless), with very high precision.

In the latter case, the network devices may for example be configured such that they interpret data packets of a particular type or containing particular (partial) information virtually as a trigger, such that, when such a data packet arrives, due to a particular configuration on a network device, an arrival timestamp and/or a departure timestamp is recorded. In one simple configuration, all arriving data packets are interpreted as a type of trigger that trigger the determination of the arrival timestamp and/or of the departure timestamp. Depending on the configuration of the network device, data packets of a first type may be interpreted as a type of trigger or data packets of another type may be filtered out and nevertheless forwarded without a timestamp being recorded. By way of example, such data packets that have a particular VLAN priority, a particular target MAC address or the like, may be considered by the correspondingly configured network device as a type of trigger.

Trigger packets are thus transmitted on the network, which trigger packets preferably contain the time of arrival of the trigger packet (arrival time) and/or the time of transmission of the trigger packet (transmission time) for at least one network device, or a plurality of network devices or each network device in the network. This has the advantage that, in parallel therewith, the data packets that are likewise transmitted on the network and are forwarded for example by a switch do not have to record any additional information with regard to the timestamp, but rather only contain its payload signal content in unchanged form. As an alternative or in addition thereto, it is obviously also possible to record a generated timestamp in the data packet, so that the timestamp generated and gathered during transmission is able to be added so as to be able to determine the defined end-to-end latency on the basis thereof. Depending on whether the transmission takes place by way of a unicast, a multicast or a broadcast method, at least one network device (or a group of similar network devices), a plurality of network devices of different types or all network devices in the network or a partial segment of the network are addressed.

The above-described method according to the invention is able to be applied to any desired network topologies (such as for example a ring topology or a line topology), including in the event of redundancy.

BRIEF DESCRIPTION OF THE DRAWING

The method according to the invention is described below and explained with reference to the figures.

In the figures:

FIG. 4: shows an exemplary structure of a trigger packet, and FIG. 5: shows a trigger packet in the event of an error.

SPECIFIC DESCRIPTION OF THE INVENTION

Figure 1:
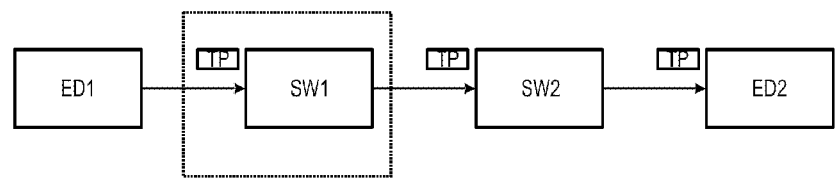
FIG. 1: shows a network in a line topology.

FIG. 1 shows, by way of example, where illustrated in detail, a network in a line topology. An actual start of the network is determined by the network device ED1 and an actual end of the network is determined by the network device ED2. Between this actual end and the actual start of the network are any desired number of network devices, such as for example two switches SW1 and SW2 that are connected to one another by suitable transmission media (such as for example in a wired manner via cable or wirelessly, for example via radio, infrared or the like) and exchange data packets, not illustrated in more detail. In addition to these data packets, trigger packets TP are transmitted. The illustration of a respective trigger packet to the left of the switch or to the left of the network device in FIG. 1 indicates that, whenever such a trigger packet arrives at the input of the network device in question, the time of the arrival (the reception) is established, that is to say a timestamp is generated. As an alternative or in addition thereto, the time at which a trigger packet leaves the respective network device may also be determined. In order to achieve a resolution or determination of the transmission time that is as precise as possible, both the reception and the transmission time are determined.

Figure 2:
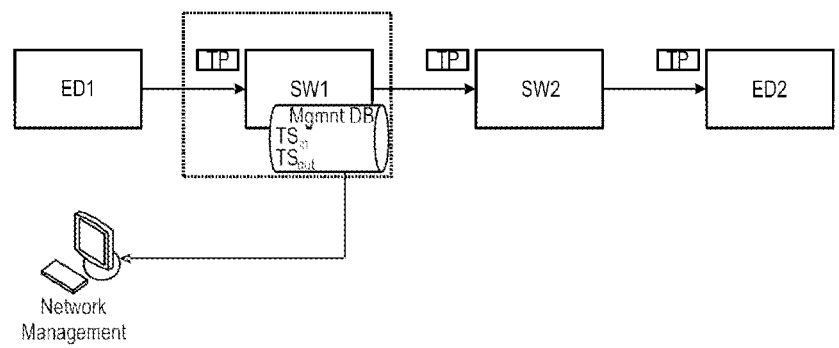
FIG. 2: shows a network in a line topology with trigger packets and a database for access via a network management system.

FIG. 2 illustrates a network in a line topology with trigger packets and a database for access via a network management system. The network according to FIG. 2 is based on the operation of the network as is illustrated in FIG. 1, but with the difference that a network management system (NMS) is permanently connected to or temporarily able to be used with at least one network device (in this exemplary case the switch SW1). The network management system may obviously also be permanently connected or able to be connected to more than one network device or all network devices that are situated in the network (independently of its topology). The arrival timestamp and/or the departure timestamp of the trigger packet, following acquisition thereof, is then stored in a storage unit of the respective network device (for example in a database, Mgmnt DB). The network management system may access this database and read the timestamp for each trigger packet that has reached or left the respective network device, and, in connection with the time stamps of the other network devices, determine the end-to-end latency for the entire network (that is to say from ED1 to ED2) or else for particular freely selectable segments of the network (such as for example from ED1 to SW2 or from SW2 to ED2) therefrom.

Figure 3:
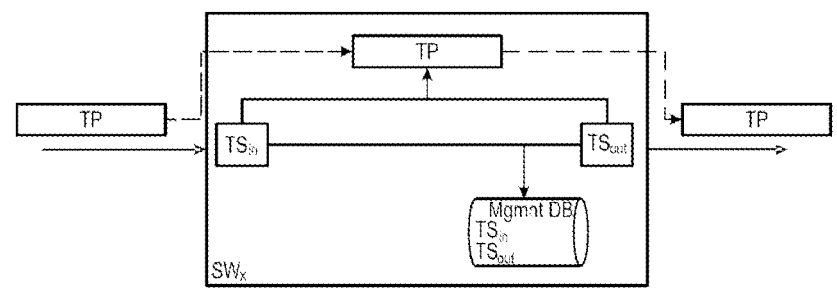
FIG. 3: shows the insertion of a timestamp "inline" and in a database of the network management system.

FIG. 3 shows the case of insertion of a timestamp "inline" and in a database of the network management system. The time of arrival of the trigger packet is in this case referenced by $TS_{in}$ and the time of transmission of the trigger packet is referenced by $TS_{out}$. These two times and/or the time interval arising therefrom may be inserted into the trigger packet, which by this network device (here referenced as SWx, x=1, 2, 3, etc.) and forwarded and/or stored in the management database Mgmnt DB. The times or time intervals may be read from this database and used for the latency determination. In the structure of the trigger packet in FIG. 3, the term "trigger frame" is used in the FIG. itself, the terms "trigger frame" and "trigger packet" being able to be understood in principle as being synonymous with one another. If the method according to the invention is carried out on the layer 2 plane, the term "trigger frame" may be used, whereas the term "trigger packet" may be used if the method according to the invention is performed on the layer 3 plane or above.

FIG. 4 shows an exemplary structure of a trigger packet, it being able to be seen that not just the arrival and departure time stamps of the respective network device are contained in the trigger packet, but rather that further data (for example metadata) may also optionally be contained in the trigger packet and be transmitted. The number of time stamps in this trigger packet thus indicates the number of network devices, in particular the number of terminals or interposed devices, such as for example switches. Such a trigger packet may but does not have to contain the data of the actual first network device (here ED1) or of the actual last network device (here ED2), but rather may also contain just the data of the network devices switched between these terminals, for example.

FIG. 5 shows, based on the trigger packet as illustrated in FIG. 4, a trigger packet in the event of an error, with exemplary indications of time for the respective arrival and transmission time in the respective network device.

A line topology with two terminals may serve as an example for determining the end-to-end latency between two devices (see FIG. 1, illustrating a line topology with a trigger packet). In this case, a trigger packet TP is transmitted from a network device ED1 and received by another network device ED2. Following reception of the trigger packet by the network device ED2, the end-to-end latency is able to be determined in that the transmission time of the trigger packet from the network device ED1 is derived from the reception time of the trigger packet in the network device ED2 (in this respect see FIG. 4, illustrating the structure of the trigger packet). This gives the precise end-to-end packet propagation time between the network devices ED1 and ED2. In contrast to the method of determining the end-to-end latency as is performed for example in path delay measurements in the case of IEEE 1588 E2E 2C, in the method described here, the transmission and reception times of the trigger packet on the respective network device on the relay path (transmission medium) are present in individual form. As a result of this, it is possible to draw more accurate conclusions as to the temporal path behavior in the latency determination. Furthermore, the trigger packets may be transmitted independently of the network priority, predefined by the time synchronization protocol, on a freely selected network priority. As a result, it is possible to assess the relaying of the trigger packet during the forwarding in various priority classes.

If the trigger packet cited in the above example now has an unexpectedly high delay from th1 network device ED1 to the network device ED2, on the basis of the invention, it becomes possible to consider the individual delays on each step of the transmission path and thereby to achieve a precise definition of the error source. In FIG. 5, an error is present, as an exemplary case, in the network device SW2. The determined end-to-end latency between the network devices ED1 and ED2, at 670 ns, is well beyond the expected latency. The cause of the error may now be localized to the network device SW2, since the residence time in the network device SW2, at 430 ns, is able to be determined precisely by the network management system, for example, and greatly exceeds the normal residence time—assumed to be exemplary—in a switch of 100 ns. The above numerical values are purely exemplary and not restrictive.

In the figures, the metadata that are illustrated are an exemplary packet structure.

With respect to the network devices mentioned in the embodiment and also in general, these are for example what are known as terminals (such as for example personal computers, sensors, actuators, industrial controllers and the like) that form an actual start or an actual end of a network (for example in a line or else in a ring topology). Those network devices that are arranged between these terminals generally serve for the actual distribution or relaying of data packets (containing payload signal content) and do not send, with the exception of the trigger packets provided according to the invention, any new data packets to the network or change the payload signal content of a forwarded data packet.

The invention is reproduced once again below in other words:

1. Inline: A "trigger packet" is transmitted that has the effect that individual devices, preferably each device on the transmission path that supports the method described in this case, records time stamps (for example the respective reception and/or transmission time) and inserts the measured values and optional metainformation (for example a device ID and/or the like) into the trigger packet. This results in complete recording of the temporal profile of the data relaying on individual relay paths, preferably on each relay path (including terminals supporting the method) within the network. This recording may be processed by the at least one receiver (device) or provided for further processing (for example by forwarding to a management system or by retransmission of the packet to the initiator of the measurement).

2. Out-of-band: As in 1., with the difference that the measured values and metainformation are not inserted directly into the packet on the respective device, but rather buffer-stored and made available on the network participant on which they were generated. The stored values may be queried for example via a management protocol from a management system. In this second variant of the method, mechanisms from existing time synchronization protocols (such as for example IEEE 1588) may also be used as "trigger packet" and used to generate the time stamps.

Both of the methods described above may each be applied on their own or in combination.

Further general information:
To measure the time stamps, a common time base that is as accurate as possible should be present in the network (for example on the basis of IEEE 1588).

In order to achieve a time measurement that is as precise as possible, the time stamping method should have extremely high accuracy (for example ideally hardware-assisted).

The measurement method is suitable for use with unicasts, multicasts and broadcasts.

The novelty of the invention comes to the fore in that, in contrast to existing methods such as for example IEEE 1588, there is no aggregation of the overall processing times in the trigger packet, but rather the measured values are recorded separately for a packet during the relaying and provided individually. This makes it possible for example to determine the latency contributions that are caused inter alia by individual network participants in the relaying. In addition, due to this, in time-slot methods, it is possible to monitor the compliance with temporal specifications for the transmission of individual packets and diagnose error cases.

The described measurement may be performed for example on the basis of a reserved time slot in the context of the time-slot method.

The invention claimed is:

1. A method of determining end-to-end latency in a data network containing a succession of network devices through which a data packet passes via data connections, the method comprising:
   providing the data packet with a trigger packet;
   at each device generating and adding to the trigger packet a respective reception timestamp indicating when the packet is received by the respective device and therefore indicating time needed for travel from the immediately upstream network device such that, when reaching the furthest downstream device of the succession of network devices, the trigger packet holds a plurality of timestamp representing when the trigger packet was received by the network devices; and
   calculating the end-to-end latency at the furthest downstream network device from all of the time stamps in the trigger packet.

2. The method according to claim 1, further comprising the step, in addition to generating the timestamp on reception of the trigger packet, of:
   generating a timestamp at the time of transmission of a trigger packet and adding it to the data packet.

3. The method according to claim 1, further comprising the steps of:
   inserting the timestamp generated in at least one further network device into the trigger packet as a partial data packet and
   forwarding the partial data packet into which the time stamp is inserted.

4. The method according to claim 3 further comprising the step of:
   storing the timestamp established in the at least one further network device on this network device and
   providing the timestamp for further network devices and/or a network management system.

5. The method according to claim 1, further comprising the step of:
   assigning each of the timestamp further data of the network device that generates the timestamp.

6. The method according to claim 1, further comprising the step of:
   determining the temporal profile of the data relaying of the trigger packet over the data connections that are involved from the timestamp of a respective network device.

7. The method according to claim 1, further comprising the step, upon arrival of a data packet that functions as a trigger packet on a network device or upon transmission of a data packet that functions as a trigger packet, of:
   recording and storing the timestamp on the network device on which the timestamp was generated.

8. The method according to claim 1, further comprising the step, upon arrival of a data packet that functions as a trigger packet on a network device, or upon transmission of a data packet that functions as a trigger packet, of:
   recording and inserting a timestamp into the data packet.

9. The method according to claim 1, further comprising the step of at each device:
   adding to the trigger packet when sending the data packet to the next downstream device a transmission time stamp indicating when the data packet is being sent on, the calculation of end-to-end latency taking these reception and transmission time stamps.

* * * * *